US012194329B2

(12) United States Patent
Maddalena

(10) Patent No.: US 12,194,329 B2
(45) Date of Patent: Jan. 14, 2025

(54) FIRE SPRINKLER WATERFLOW SWITCH WITH AN INTEGRATED NAC POWER SOURCE

(71) Applicant: Kris L. Maddalena, Apache Junction, AZ (US)

(72) Inventor: Kris L. Maddalena, Apache Junction, AZ (US)

( * ) Notice: Subject to any disclaimer, the term of this patent is extended or adjusted under 35 U.S.C. 154(b) by 395 days.

(21) Appl. No.: 17/871,919

(22) Filed: Jul. 23, 2022

(65) Prior Publication Data

US 2024/0024719 A1 Jan. 25, 2024

(51) Int. Cl.

| | |
|---|---|
| ***A62C 37/44*** | (2006.01) |
| ***A62C 3/00*** | (2006.01) |
| ***A62C 35/60*** | (2006.01) |
| ***A62C 35/64*** | (2006.01) |
| ***G08B 17/04*** | (2006.01) |

(52) U.S. Cl.

CPC .............. *A62C 37/44* (2013.01); *A62C 3/006* (2013.01); *A62C 35/605* (2013.01); *A62C 35/64* (2013.01); *G08B 17/04* (2013.01)

(58) Field of Classification Search

CPC ....... A62C 35/605; A62C 35/64; A62C 35/68; A62C 37/44; A62C 37/50; G08B 17/04

See application file for complete search history.

(56) References Cited

U.S. PATENT DOCUMENTS

| | | | | | |
|---|---|---|---|---|---|
| 818,999 | A | | 4/1906 | Bell | |
| 903,152 | A | | 11/1908 | Bell | |
| 984,210 | A | | 2/1911 | Blackwell | |
| 988,768 | A | | 4/1911 | Goldstein | |
| 1,738,656 | A | * | 12/1929 | Lowe | A62C 35/605 169/17 |
| 2,014,042 | A | * | 9/1935 | Fox | A62C 35/605 200/81.9 R |
| 3,825,766 | A | * | 7/1974 | Connor | G08B 7/00 340/289 |
| 4,051,467 | A | * | 9/1977 | Galvin | G08B 17/04 340/611 |
| 6,864,591 | B2 | | 3/2005 | DeFrank | |

(Continued)

FOREIGN PATENT DOCUMENTS

| | | |
|---|---|---|
| CN | 201631957 U | 11/2010 |
| CN | 202065881 U | 3/2011 |

(Continued)

*Primary Examiner* — Darren W Gorman

(74) *Attorney, Agent, or Firm* — Mark V. Loen

(57) ABSTRACT

The conceived invention simplifies current art methods of incorporating fire notification appliances with fire sprinkler systems by replacing vane and pressure type of waterflow switches with a single water driven generator having dual functionality. It includes power generation and activation when water moves through a sprinkler system. A notification appliance may use audible, visible, or other stimuli to alert the occupants of a fire. The system also includes a waterflow switch output to trigger an external fire/security alarm system when required and a digital controller with a delay timer to prevent false alarms due to water pressure fluctuations. Another embodiment includes both alarm monitoring and circuit supervision to enhance operation and system maintenance.

18 Claims, 10 Drawing Sheets

(56) References Cited

U.S. PATENT DOCUMENTS

| | | | | |
|---|---|---|---|---|
| 7,100,701 | B2 * | 9/2006 | Sprakel | A62C 35/605 169/29 |
| 8,319,367 | B2 | 11/2012 | Liao et al. | |
| 2007/0236913 | A1 | 10/2007 | Caillaba et al. | |
| 2008/0224877 | A1 * | 9/2008 | Young | G01F 1/38 340/606 |
| 2010/0071915 | A1 | 3/2010 | Caldani | |
| 2017/0319883 | A1 * | 11/2017 | Akers | G10K 7/06 |
| 2018/0144595 | A1 | 5/2018 | Akers | |
| 2018/0361184 | A1 * | 12/2018 | Pohl | A62C 37/36 |
| 2020/0139176 | A1 * | 5/2020 | Pohl | A62C 35/605 |
| 2020/0188714 | A1 * | 6/2020 | Hofmann | G01F 1/28 |
| 2020/0282248 | A1 * | 9/2020 | Kempf | A62C 35/62 |

FOREIGN PATENT DOCUMENTS

| | | | | |
|---|---|---|---|---|
| CN | 2037500078 | U | 8/2014 | |
| CN | 110465031 | A * | 11/2019 | B65D 90/22 |
| GB | 2515579 | A * | 12/2014 | B65D 90/22 |
| JP | 2004113665 | A | 4/2004 | |
| JP | 2006006691 | A | 1/2006 | |
| JP | 6400455 | B2 | 10/2018 | |
| WO | WO2014067062 | A2 | 5/2014 | |

* cited by examiner

FIRE SPRINKLER WATERFLOW SWITCH WITH AN INTEGRATED NAC POWER SOURCE

FIELD AND BACKGROUND OF THE INVENTION

(1) Field of the Invention

This invention is directed to an improved method of connecting fire notification devices to a fire sprinkler system, with a self-generating power source to increase reliability in a variety of building life-safety applications.

RELATED APPLICATIONS

Not applicable

STATEMENT OF GOVERNMENT INTEREST

Not applicable

(2) Description of Related Art

The automatic fire sprinkler system was patented by Philip W. Pratt of Abington, Massachusetts, in 1872. This was followed by the automatic electric fire alarm system patented in 1890 by Francis Bobbins Upton, an associate of Thomas Edison. And over the years the fire protection trade has grown at an exponential rate since the above technologies were first introduced, giving way to new innovations that have radically improved the life-safety industry, with national codes and regulations keeping pace.

A modern home fire sprinkler system is designed to contain and extinguish a fire at or near its origin. However, by itself, it does not alert the household of the emergency situation and requires additional notification equipment for the occupants. The most common types of notification equipment are an exterior riser bell, a standalone smoke alarm, and a fire alarm system.

While an exterior riser bell may draw the attention of anyone outside their homes; it does very little for those inside the house. The sound from an outside bell is attenuated by the walls and drowned out by any interior ambient noise. Also, it is known that most sleeping children, especially those with a hearing impairment, will not awaken to the high frequency pitch of a smoke alarm. Adults under the influence of any substances have similar difficulty. This reduces the amount of time needed to safely evacuate.

Fire alarm systems on the other hand are designed to detect the early signs of a fire and then alert the occupants of the building to evacuate. A fire alarm system can even dispatch the local fire department to that location. Therefore, both a fire extinguishing system and an alarm system are undeniably essential. Such systems are required by code in most jurisdictions and their design depends on building structure and occupancy. Combining these two systems through a sprinkler waterflow detection switch reduces the loss of life and property damage. However, both systems do have their inherent strengths and weaknesses.

Automatic Fire Sprinkler Pros: They are proven to be more reliable and effective than the delayed response of the local fire department. Most fires are extinguished by the time they arrive on-site. Property damage and environmental impact is substantially lower with fire sprinkler systems, especially compared to a fire department's aggressive methods to put out a fire. Fortunately, a fire sprinkler system can operate independently, without the need of an external power source.

Automatic Fire Sprinkler Cons: As a standalone system it cannot alert anyone that it has been actuated. Notification requires the use of one or more of the following: a water motor gong, an electrified waterflow switch combined with a local exterior riser bell, and a fire alarm system with interior and exterior notification devices. Once the sprinkler system releases water, it will continue to flow until stopped manually by a human closing a valve. In this design, any form of notification is beneficial in reducing further water damage once the fire has been extinguished. Also, a broken sprinkler head/pipe may continue unnoticed for some time.

Waterflow Switch Pros: The most common and least expensive method to interface a fire alarm panel with a sprinkler system is to use a vane or pressure waterflow switch. It has an adjustable means to delay the output up to 90 seconds which prevents water pressure fluctuations from triggering a false alarm.

Waterflow Switch Cons: The waterflow switch is strictly a component and not a standalone device. It requires additional equipment, such as a riser bell and/or a fire alarm system to have any fire life-safety value. The waterflow switch commonly utilizes a pneumatic time delay mechanism which is known to have one of the highest failure rates in fire sprinkler systems. This is due to the wear and tear of its pneumatic damper and exposure to the elements. These difficulties result in sporadic false alarms. Consequently, this requires the entire waterflow switch to be exchanged for a new one since replacement parts are not readily available. This is an expensive repair as it typically requires participation of both the fire sprinkler and alarm technicians.

There are two types of bells on the market, the electromechanical and the water motor gong (WMG). The electromechanical is the most common and is usually powered directly by a 120 VAC source and is mounted to the exterior of the building. The WMG is completely mechanical, operating on the principle of flowing water rapidly spinning a turbine that rotates a striker, which in turn clangs against the gong. This eliminates the need for an external power source which makes it fail-safe in areas with unreliable utility service. Alternately, an electric bell is used which comes in lower voltage ratings and can be wired directly to a lower voltage source from a typical fire alarm system.

Fire Alarm Systems based on smoke or heat are designed to detect the early signs of a fire, alerting the building occupants to evacuate. They can also communicate with an off-site monitoring station, which then dispatches the local fire department to that location. An early warning may also be enough time for someone on-site to evaluate and extinguish the fire prior to the local fire department arriving.

However, on its own, this kind of fire alarm system is not designed to alert anyone that a sprinkler head has been actuated. It requires the use of a separate waterflow switch to trigger an alarm. It also requires a dedicated 120 VAC power source and backup batteries, with associated peripheral devices installed per fire code. And depending on the type of installation, periodic inspections are required, increasing the overall operating costs.

The last and most recognized form of life-safety equipment is the standalone smoke alarm found in most private homes, apartments, and hotels. It is a self-contained device with the smoke sensor, sound tone generator, and optional strobe light being integral parts of the unit. Although similar to the smoke detector found in most commercial and industrial environments, this device is not interchangeable. A smoke detector is a smoke sensor only, relying on a central fire alarm panel to control and power the notification appliances, such as horns, strobes, and low frequency sounders. Smoke alarms come in many designs, and as with most things, have their pros and cons.

Standalone Smoke Alarm Pros: For the homeowner this device is the least expensive option when compared to a complete fire alarm installation. They can be hardwired to a standard 120 volt household circuit; with an integral backup battery should the main power fail. Others are powered from a battery alone. Modern devices even allow multiple smoke alarms to be linked through a pair of wires or wirelessly, causing all alarms to sound throughout the home at the same time when one of them senses smoke. And depending on the technology used to sense smoke particles, the device typically detects smoke presence before the temperature increases and triggers the sprinkler head. It is a very cost-effective early warning system.

Standalone Smoke Alarm Cons: These devices do not have the reliability of a commercial grade smoke detector tied to a fire alarm system. A 120 volt device with a failed battery backup is inoperable during power outages or a circuit breaker trip. And the functionality of a device that is powered from a battery alone is questionable should the battery expire before replacing it. They are notorious for false alarms, and relentlessly chirp when the battery is low. This can frustrate a homeowner to the point of permanently disabling the device, making them useless.

Further, years of laboratory testing have proven that the typical smoke alarm tone of about 3 kilohertz will not awaken most children, those with diminished hearing, or adults under the influence of any substances. Whereas a low frequency tone of 520 hertz will. However, due to the higher power requirements and enlarged physical size of the low frequency generator, currently available smoke alarms do not produce the 520 hertz tone output.

In order to use the more effectual low frequency sounders, a complete fire alarm system needs to be installed. Unfortunately, most homeowners opt out due to its high cost and maintenance requirements. What is needed is a simple and effective way to sound an alarm by a high reliability device that avoids the difficulty and frustrations of current art devices and arrangements.

SUMMARY OF THE INVENTION

The conceived invention simplifies current art methods of fire sprinkler systems by replacing vane and pressure type of waterflow switches with a single water driven hydroelectric flow switch generator having dual functionality. It includes power generation and fire alarm system activation when water moves through a sprinkler system. The system also includes a digital controller to drive at least one notification appliance device which sounds an alarm. The alarms comprise an exterior riser bell, low frequency sounders, horns and flashing strobes.

Another embodiment of the invention works with both current fire sprinkler and fire alarm systems. It includes both alarm and circuit supervisory functions to enhance the operation and maintenance of these systems.

DETAILED DESCRIPTION OF THE INVENTION

The embodied invention is conceived to be useful in private one and two family homes, multifamily apartment complexes, and commercial or industrial buildings. The invention works with the operation of fire sprinkler systems. In a sprinkler system, water is held under pressure within dedicated pipes and prevented from flowing out by the sprinkler heads. When a fire raises the temperature to the triggering point, the sprinkler head nearest to the flames bursts open and releases the water to extinguish the fire.

The conceived invention utilizes an HFS and can be adapted to various types of commercial/industrial fire sprinkler configurations. However, it is ideally suited for one and two family homes. The HFS gives the homeowner an option of installing low frequency sounders in each of the sleeping areas, without the major expense of having to install a complete fire alarm system. This technology increases the life-safety effectiveness of the home sprinkler system a magnitude several times over one that solely relies on an exterior bell and/or standalone smoke alarms, saving lives, resources, and money. The Hydroelectric Flow Switch operates completely off the grid with clean renewable energy, consumes absolutely no power while in its standby mode, and functions with zero emissions. The HFS is virtually maintenance free, with no backup batteries to maintain or replace, and is not affected by utility power surges and outages.

The instant a sprinkler head is triggered, the HFS taps into the kinetic energy of the water moving through the fire sprinkler riser and self-generates enough electricity to power its own electronic time delay circuitry and any of the notification appliances connected to its notification appliance circuit output.

The HFS can be constructed from any suitable material, such as plastic and/or metal. The device can be designed as a single unit with the generator, the electronic circuitry, and all associated components housed within the same enclosure. Or in a preferred embodiment, the device is designed as a modular system with the generator and turbine in one enclosure, and the electronic control circuitry in another enclosure. A two part modular design allows the two to be linked through a cable harness. The generator can be designed to output a direct or preferably an alternating current. The turbine can be designed with different blade styles such as straight, curved, or concave.

Figure 1A:
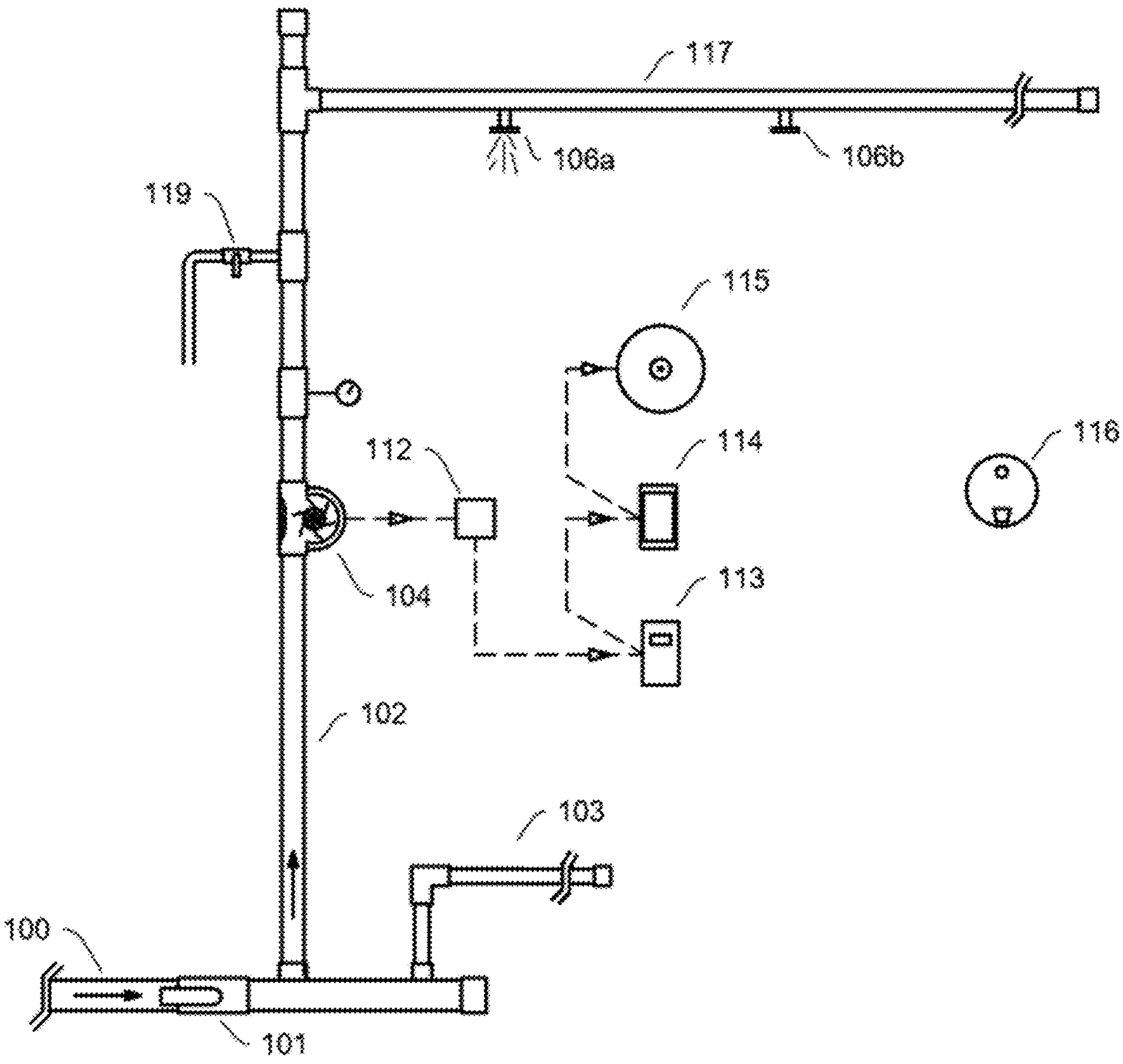
FIGS. 1A-1B shows an embodiment where a water driven generator provides power for fire notification devices in a residential setting.

In FIG. 1A, the most basic of the fire protection system is shown for a fire sprinkler system. When a sprinkler head activates, the moving water will spin a generator to provide a basic power feed to sound an alarm. This simple method must include various enhancements as water pressure fluctuations (or other causes) may briefly cause the alarm to sound, creating a condition of nuisance alarms that create an environment of distrust for the alarm system when it activates. Features are also added to ensure the system is properly connected and the various components can be inspected periodically, depending on the local fire code, to verify correct operation.

FIG. 1A shows an embodied fire sprinkler system configuration in one and two family homes utilizing the new hydroelectric generator design. This system is a significant improvement over previous designs by allowing a homeowner to add audio and visual alarms to critical areas, without the expense of installing a complete fire alarm system. As shown in FIG. 1A, the sprinkler system riser 102 is separated from the domestic water line 103, and is fed from the city water supply 100. A ball valve 101 in line with the city water supply 100 is used to turn both the sprinkler and residential water off and on, but its status does not need to be monitored by a fire alarm system, per typical fire code. The city water supply 100 is used to feed the fire sprinkler riser 102 and the connected sprinkler distribution pipe 117 with water pressure. The water is prevented from spraying out any of the sprinkler heads 106*a,b* until a liquid filled glass bulb breaks. Typically, the glass bulb is designed to break at an ordinary temperature range of about 135-170 deg. F. or higher at 175-225 deg. F. as defined in NFPA 13D. A sprinkler head typically discharges 10-25 gpm. Other sizes can be used.

When the temperature around an individual sprinkler is high enough to break the bulb, it separately activates as illustrated by open sprinkler head 106*a* and closed sprinkler head 106*b* respectively. When the bulb breaks, water sprays over the flames in that area. Spraying water flows through the sprinkler riser and through the hydroelectric generator 104. The generator creates electrical power (AC or DC), and the exit water continues on to the sprinkler distribution pipe 117. The electrical power output of the generator 104 is connected to the HFS control module 112 where the power is regulated to the proper voltage level for a digital microcontroller, and immediately starts the delay timer sequence. The delay timer is needed to prevent false alarms from water pressure surges and other reasons. The delay is adjustable from 0 to 90 seconds, and typically set between 30 to 60 seconds.

At the end of this delay timer sequence, the module 112 notification appliance circuit (NAC) output turns on all alarm notification devices: strobe 113, low frequency sounder 114, and alarm bell 115, without the need of any external power supply. The generator 104 is designed to supply all the power needed for the module 112 and notification devices 113, 114, and 115 regardless of the number of sprinklers activated. Optionally, a separate smoke alarm 116 is installed for redundancy, and is usually needed depending on local fire codes.

An inspector's test valve 119 is installed downstream from the generator and can be turned on for inspection, testing, and troubleshooting. The water flow is sent to a drain. The designed water flow through the valve is equivalent to the amount of flow through the smallest sprinkler head on the system when activated.

The ability to power the fire alarm notification devices separately from other electrical power sources is a distinct advantage of the embodied invention. In some cases, a fire causes the external electrical power to be shut off, and battery backup systems may fail. Also, the embodied invention replaces the vane waterflow switch which is known to be unreliable.

Figure 1B:
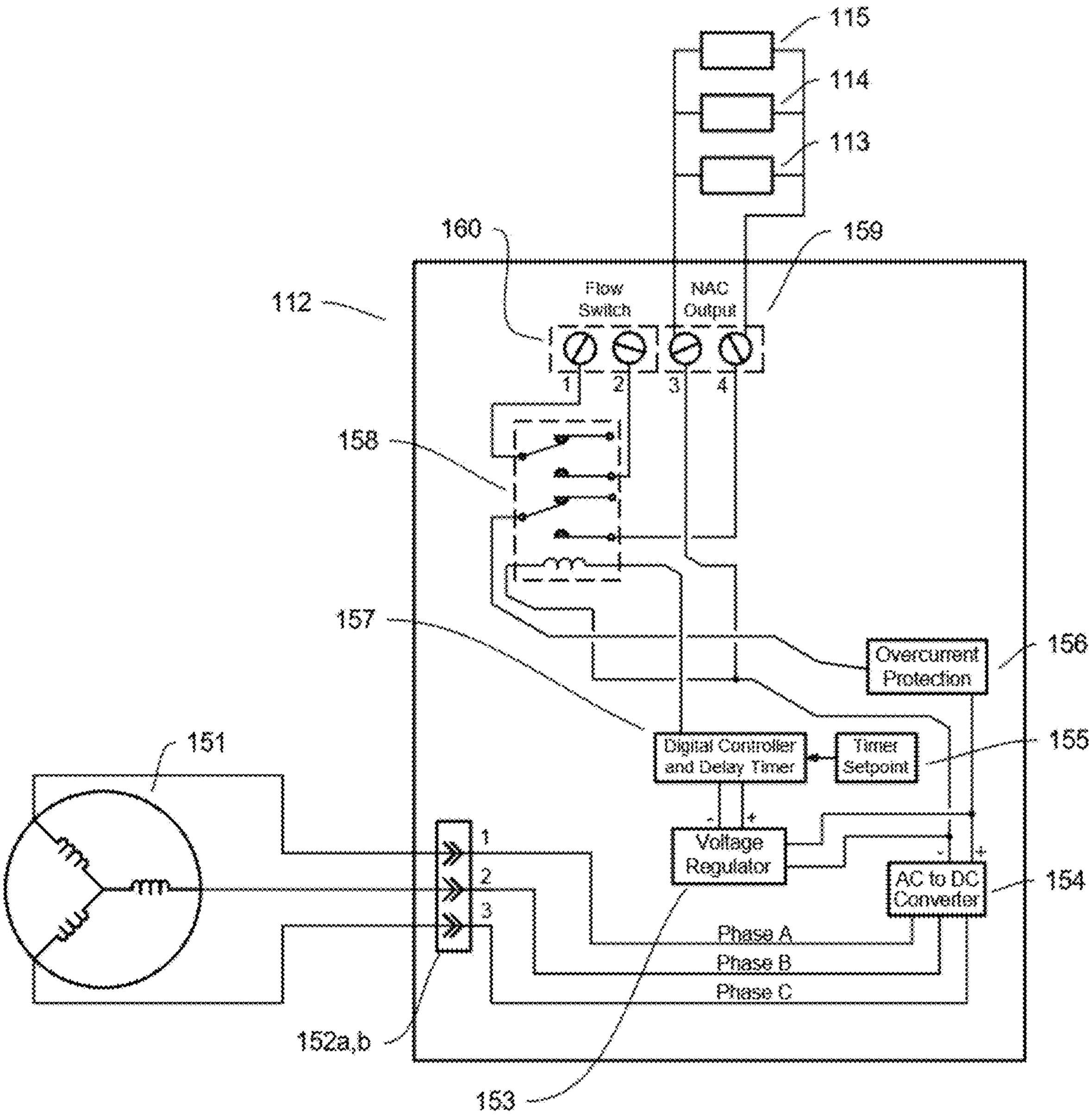

In FIG. 1B, the sequence of normal operation of FIG. 1A fire sprinkler system where the alarm notification devices are connected to the HFS control module 112 starts with a fire that activates at least one sprinkler head. Water then flows through the sprinkler riser conduit. The HFS generator 151 then spins and generates AC power to supply the AC to DC converter 154. In this case the voltage is unregulated, and the converter 154 only rectifies the power to DC. The AC power that feeds the converter is approximately 28 VAC, with a tolerance of plus/minus a few volts. The HFS generator is connected to the rectifier on the HFS control module 112 by a plug 152*a,b*.

The converter 154 rectifies the AC power to DC and a separate voltage regulator 153 controls the DC voltage to a constant amount for the digital microcontroller and an internal delay timer 157. Typically, the voltage is set to microcontroller requirements to avoid additional voltage regulation devices.

The internal delay timer 157 is immediately started when power is applied to the digital microcontroller. A timer setpoint 155 is used to avoid nuisance alarms and is typically set at a value of 30-60 seconds. When the timer reaches zero, and power is still being supplied by the generator, an alarm relay 158 is activated and sends a voltage to the NAC output 159. The alarm notification devices 113, 114, 115 are then activated concurrently. The operating voltage range for a typical 24 VDC rated notification appliance is 16 to 33 volts DC. This allows the notification appliances to utilize the unregulated DC voltage directly from the AC to DC converter. Using unregulated DC voltage means that there is no separate voltage control circuit added to the generator, nor is there voltage regulation included in the generator.

An overcurrent module 156 protects the HFS control module 112 and generator 151 from damage, due to excessive current drawn in the event of a short circuit across the NAC output. It also assures that the waterflow switch continues to function properly and will still trigger an external fire alarm system, if one is being used, even though the NAC output has been disconnected from its HFS generator power source.

Figure 1C:
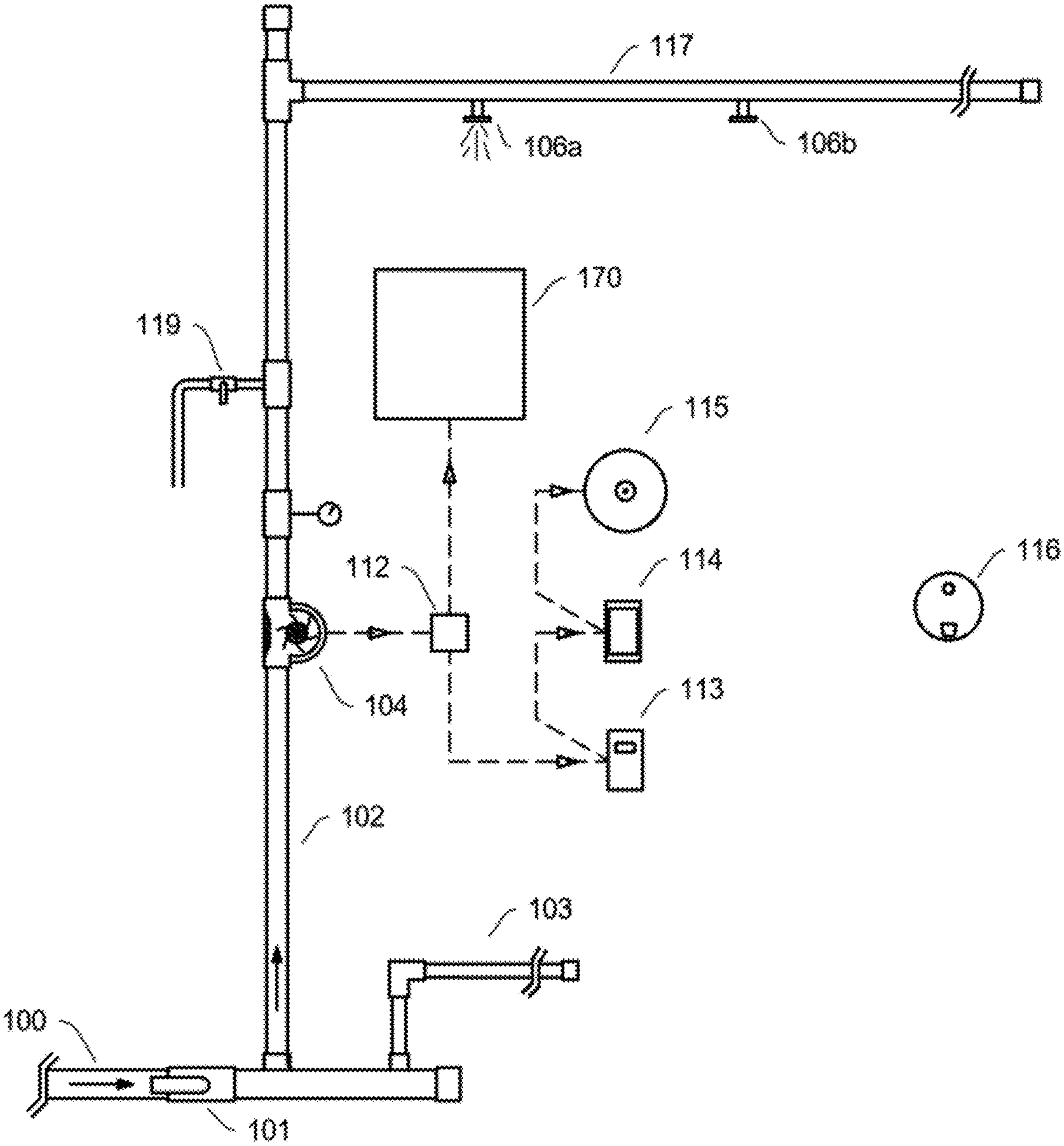
FIGS. 1C-1D shows a similar embodiment as FIGS. 1A-1B, but with an added separate fire alarm system.
Figure 1D:
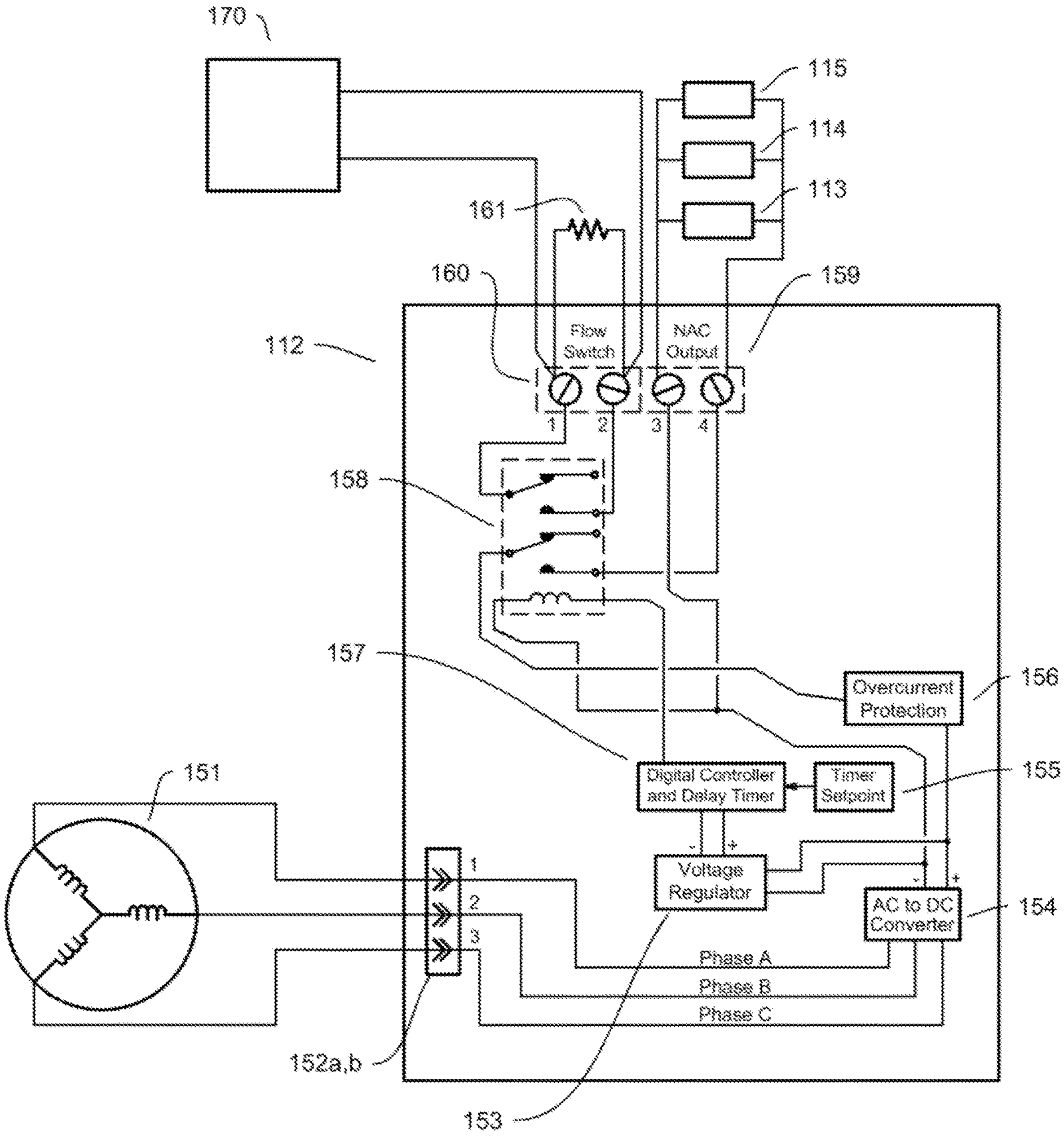

FIG. 1C shows an embodiment of the invention where a 3$^{rd}$ party fire alarm system 170 is connected to the flow switch terminals 160 of FIG. 1D. In this case, the flow switch is a function of the alarm relay 158 state, and the contacts close when the relay is energized. As seen in FIG. 1D, a resistor 161 is seen by the fire alarm system 170 when the relay is not energized. When the alarm relay 158 energizes after the timer delay is completed, the resistor is no longer seen as the flow switch terminals 160 then show a short (i.e., no resistance). The resistor tells the fire alarm system 170 that the wiring is not broken or disconnected when there is no fire.

In FIG. 1D, the NAC output activates alarm notification devices 113-115 by using unregulated power from the generator 151 when alarm relay 158 is activated due to a fire.

The generator 151 is designed so that the power needed for the digital microcontroller and the alarm notification devices can be provided by a single activated sprinkler head.

Figure 2:
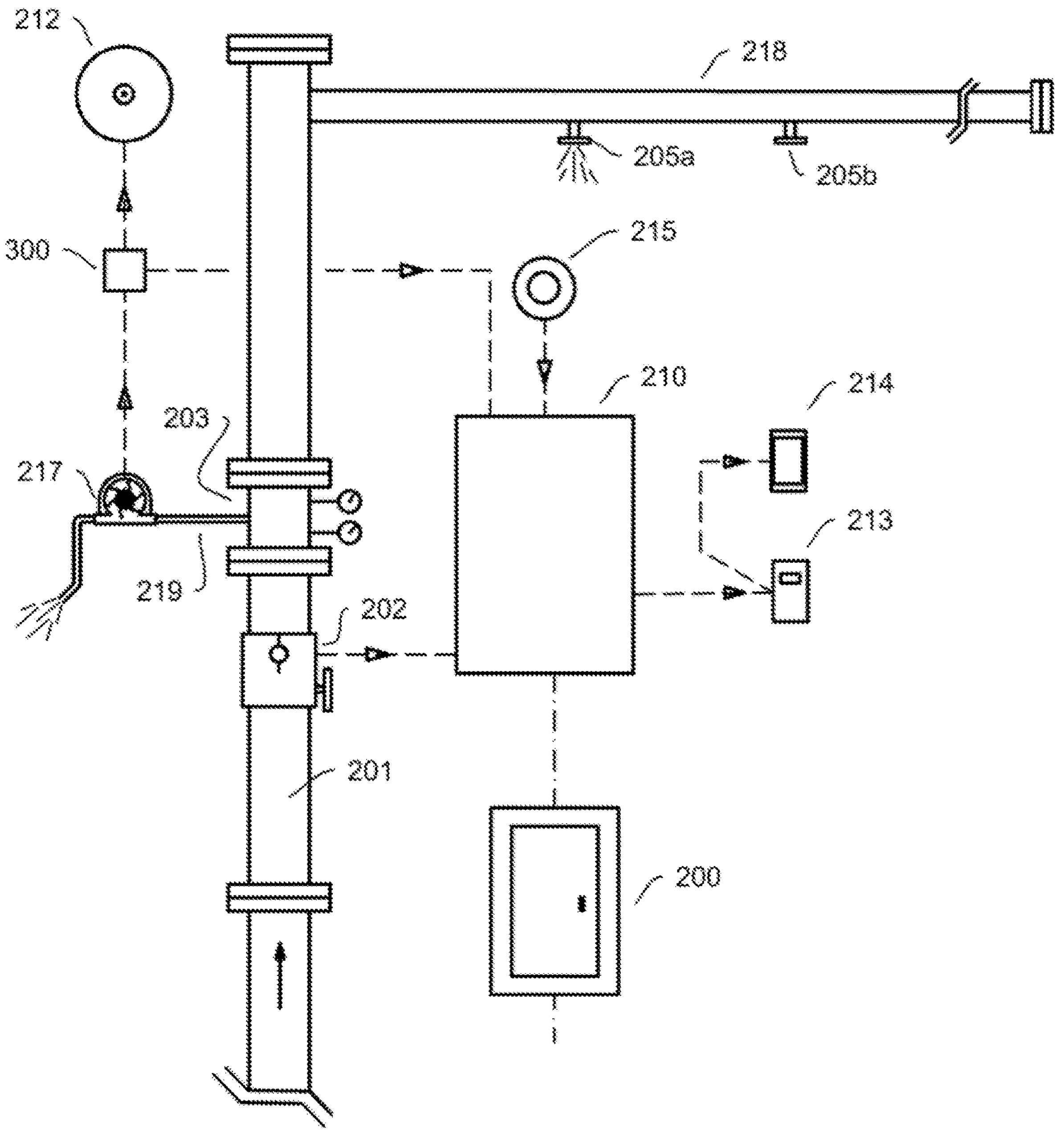
FIG. 2 shows an embodiment where a water driven generator provides power for a local riser bell and a flow detection switch to trigger a fire alarm system in a commercial setting.

FIG. 2 is similar in design to FIG. 1A, but a larger, commercial building size system is shown. Since more sprinklers are needed for the larger building, the piping is much larger and it is cost prohibitive to install a generator directly in the sprinkler feed pipe. Also, fire codes for larger buildings are different, and a fire alarm system must be installed that will sound multiple alarms, potentially across many offices or floors such as may be needed for a tall building. The needed power to operate the system is much greater, and a hybrid design is cost effective. The larger system also requires a higher amount of inspection and testing.

The sprinkler system riser 201 is connected to the building water line (not shown) and is typically fed from a city water supply. The water supply feeds the fire sprinkler riser 201 and the connected sprinkler distribution pipe 218 with water pressure. The water is prevented from spraying out any of the sprinkler heads 205*a,b* until a liquid filled glass bulb breaks from the heat of a flame.

When an individual sprinkler bulb breaks, it activates a sprinkler head 205*a* but not neighboring sprinkler head 205*b*. The actuated sprinkler head causes water to flow through the sprinkler riser 201 and through a tamper butterfly valve 202. The tamper valve has an electrical contact that closes and notifies the fire alarm system 210 if the valve has been closed. The fire alarm system then notifies maintenance/security of a system fault due to the closed supply valve. This prevents unauthorized individuals from tampering with the valve, hence its name.

The riser 201 is monitored by the fire alarm system 210 through the HFS control module 211. In its standby state the city water supply fills the riser 201 on both sides of the normally closed alarm check valve 203 and distribution pipe 218 with water under pressure. The water is prevented from flowing until one or more of the heads are triggered by enough heat from a fire, as shown by closed sprinkler head 205*b* and open sprinkler head 205*a* respectively. When sprinkler head 205*a* triggers and starts spraying water over the flames, water flows up through the riser 201 and into alarm check valve 203 where it forces an internal valve to open up a small water pathway 219 to the HFS generator 217, with the majority of the water feeding the distribution pipe 218. This is accomplished by the internal mechanical motion of the check valve. Alarm check valves that provide this function are commercially available.

The small amount of water flows through the hydroelectric generator 217 where it spins a water based turbine that generates an alternating current, before exiting through the drain pipe. The output power of the hydroelectric generator 217 is connected to the input of the HFS module 211 where the power is conditioned and regulated to the proper voltage level to energize the microcontroller, which in turn starts a delay timer. Again, the delay is typically 30-60 seconds. At the end of the delay, and the generator still creating power, the waterflow switch and NAC output circuit of module 211 activate. This triggers the alarm system 210 and an associated bell 212 respectively. The fire control system 210 then powers the strobe 213, and horn 214, and other devices as designed.

The HFS generator and control module replaces several of the unreliable water based mechanical components, such as a retard chamber, pressure waterflow switch, water driven motor gong, and associated piping, resulting in a substantial savings.

Smoke detector 215 activates during a fire and sends an alarm signal to the fire control system 210. The fire control system is powered by an electrical circuit breaker panel 200.

The FIG. 2 sequence of operation for the HFS control module 211 when interfacing with a separate fire alarm system 210 with fire alarm notification devices 213, 214 is described in FIGS. 3A-3E.

Figure 3A:
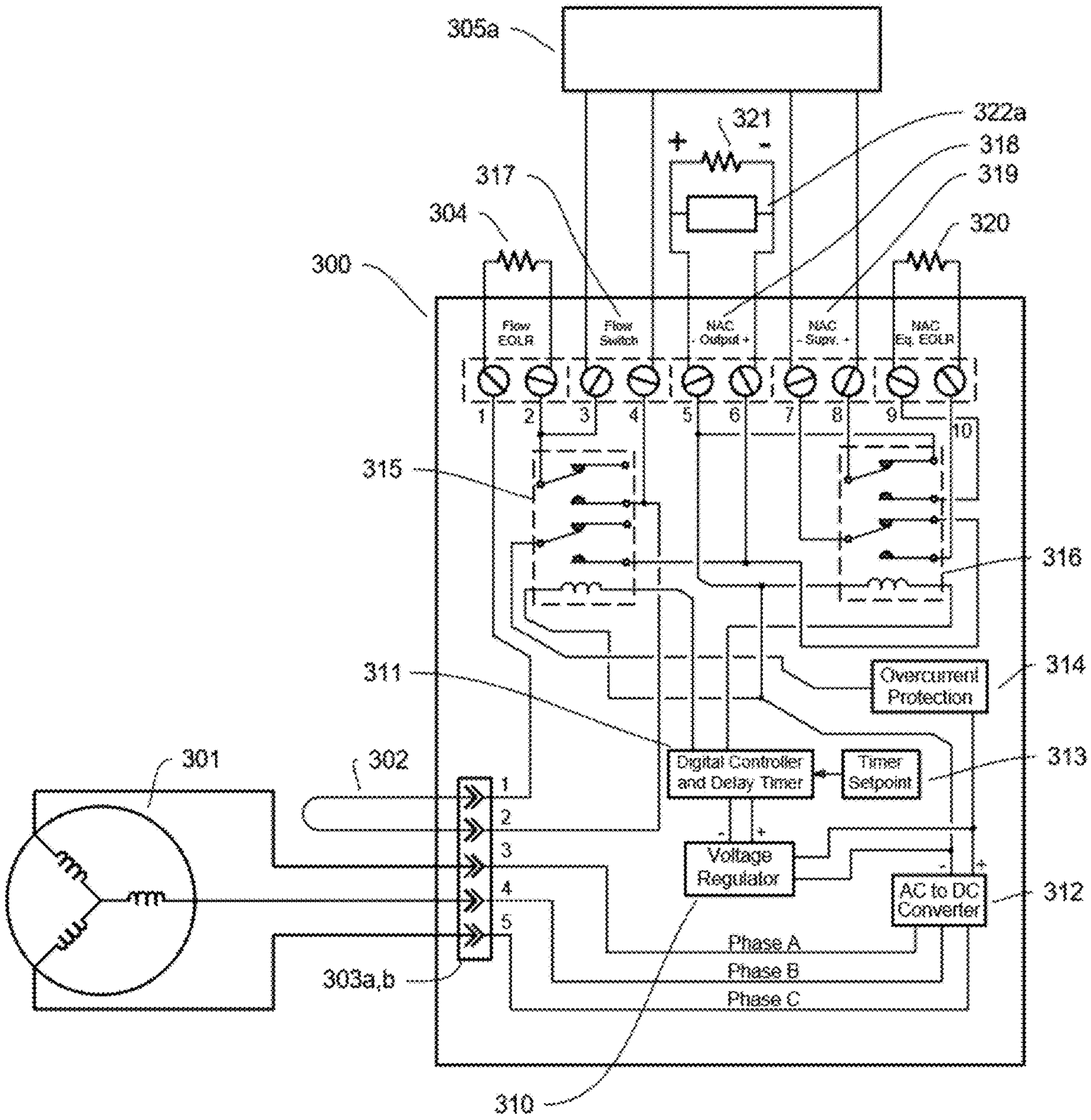
FIGS. 3A-3E shows how the Hydroelectric Flow Switch (HFS) control module handles various fire and error scenarios by using an alarm relay and a supervising relay in addition to the water driven generator.

In FIG. 3A the functions for the connecting wiring terminals are:

1) NAC (power) output terminals 318. They are used to energize any notification appliances (bells, horns, strobes, low frequency sounders, etc.) connected to this circuit whenever a fire sprinkler head is activated and water flows through the sprinkler conduit. This power is completely sourced from the HFS generator, and the power is sent to the NAC output terminals concurrently when the alarm relay changes state.

The power is preferably unregulated DC power directly from the AC-DC converter 312 for circuit efficiency. Alternately, this can be regulated if the NAC appliances require a specific DC voltage for activation.

2) Flow switch terminals 317. This is used for both circuit supervision and alarm monitoring. The circuit is supervised through a 3rd party fire alarm system 305*a* and an end of line resistor 304 when there is no fire. But, when the HFS generator turns on, and the timer countdown is completed, the terminals show no resistance (i.e., a contact closure), which in turn triggers the alarm system.
3) NAC supervisory terminals 319. Similar to the flow switch terminals, an end of line resistor 321 is monitored when there is no fire and is installed on the last notification device out in the field. This allows the 3rd party fire alarm system 305*a* to monitor the NAC supervisory terminals 319 for field circuit continuity and for any alarm notification devices attached to the HFS module 300. However, when supervisory relay 316 energizes, it switches the NAC supervisory terminals to the equivalent EOLR 320 mounted on the NAC Eq. EOLR terminals. The 3rd party fire alarm system will still see an end of line resistor and not find a circuit fault. This feature allows the HFS module to power at least one notification device without causing a circuit fault on the 3rd party fire alarm system.

FIG. 3A shows a normal operation of the HFS control module in the event of a fire, connected to a fire alarm system 305*a*, and utilizing circuit supervision:

1) Fire starts and activates at least one sprinkler head. Water flows through the sprinkler riser conduit.
2) The HFS generator 301 spins and generates AC power. The AC power is applied to the HFS module 300 at the connector 303*a,b*. The HFS module is only powered by the HFS generator 301, and is without power until now.
3) The AC power is rectified and filtered to DC 312, with a small portion of the DC power being regulated to the appropriate level for the control circuitry, and the remainder of the unregulated DC power routed to the alarm relay 315.
4) The regulated DC power 310 is applied to the digital controller and delay timer 311, which then begins to countdown automatically from the timer setpoint 313.
5) Simultaneously, the supervision relay 316 is energized and changes state prior to the end of the countdown. When the supervisory relay 316 energizes, it switches the NAC supervisory terminals 319 from the NAC output terminals 318 to the equivalent EOLR 320 mounted on the NAC Eq. EOLR terminals. The 3rd party fire alarm system will still see an end of line resistor and not find a circuit fault. A typical resistor value is 47 k ohms, though other values can be used.
6) The alarm relay 315 is then energized and changes state at the end of the countdown, simultaneously closing the waterflow switch 317 and applying the unregulated DC power to the NAC output 318. Any alarm notification devices connected to the NAC output 318 are then activated and powered by the generator 301. This provides for redundant alarms in key areas, such as the fire panel or a security station in a large building.
7) The fire alarm system 305*a* and any local notification device(s) are activated concurrently.
8) Eventually the fire is extinguished and the water supply valve is manually closed.

Water stops flowing through the sprinkler riser conduit. The HFS generator stops generating power.

9) Both the supervision 316 and alarm 315 relays de-energize and revert back to their original standby state. 10) The NAC output 318 deactivates, and the fire alarm system 305*a* can be manually reset.

The flow switch 317 is a unique and special design. It is monitored by the fire alarm system 305*a,b,c* for three types of outputs. The normal case is to look for the value of the resistor 304 in the circuit. This means the circuit and all devices are connected properly. The second is a contact closure, meaning that there is a fire. Lastly, an open circuit will indicate that there is a problem with the circuit, and maintenance is required to troubleshoot the problem.

Figure 3B:
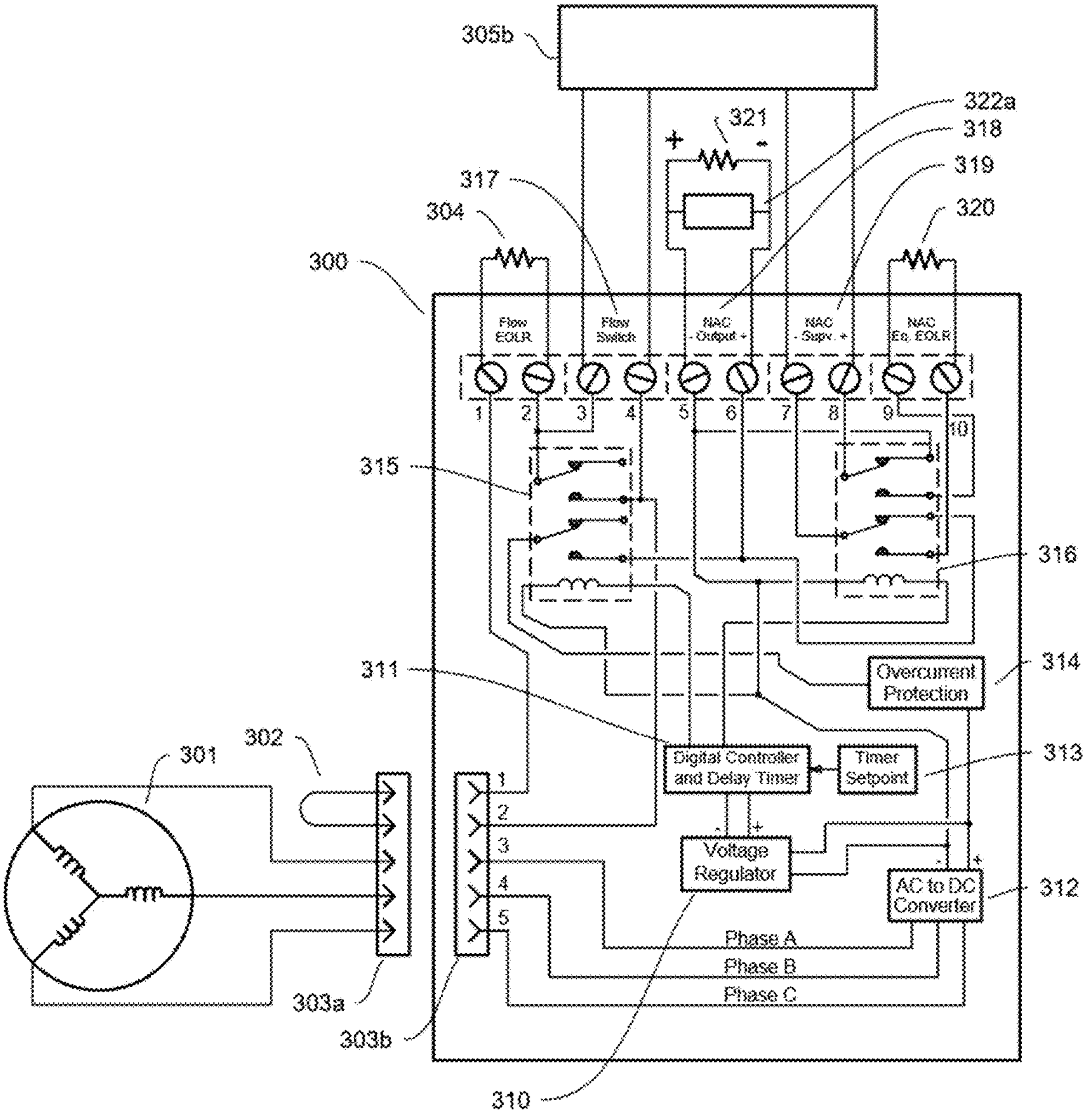

FIG. 3B shows the embodied invention during a fire. The fire alarm system 305*b* is connected to the flow switch terminals on the module, and circuit supervision is utilized, where the cable link 303*a,b* has been damaged or disconnected:

1) In this case, the cable link between the HFS generator and the HFS control module has been either damaged due to an unintentional physical act or disconnected in order to perform scheduled maintenance. This means that the jumper 302 no longer appears on the connector's receptacle 303*b*, across terminals 1 and 2, and there is an open circuit. 2) The flow switch output 317 on the HFS control module 300 presents an open circuit trouble condition to the alarm panel 305*b*, which is due to one leg of the EOLR 304 being removed from the circuit via the jumper 302. The fault is recognized by the alarm system 305*b*.

3) Fire starts and activates at least one sprinkler head. Water flows through the sprinkler riser conduit. The HFS generator spins and generates AC power.

4) However, no further actions take place since the wiring link or connector 303*a,b* has been compromised.

Figure 3C:
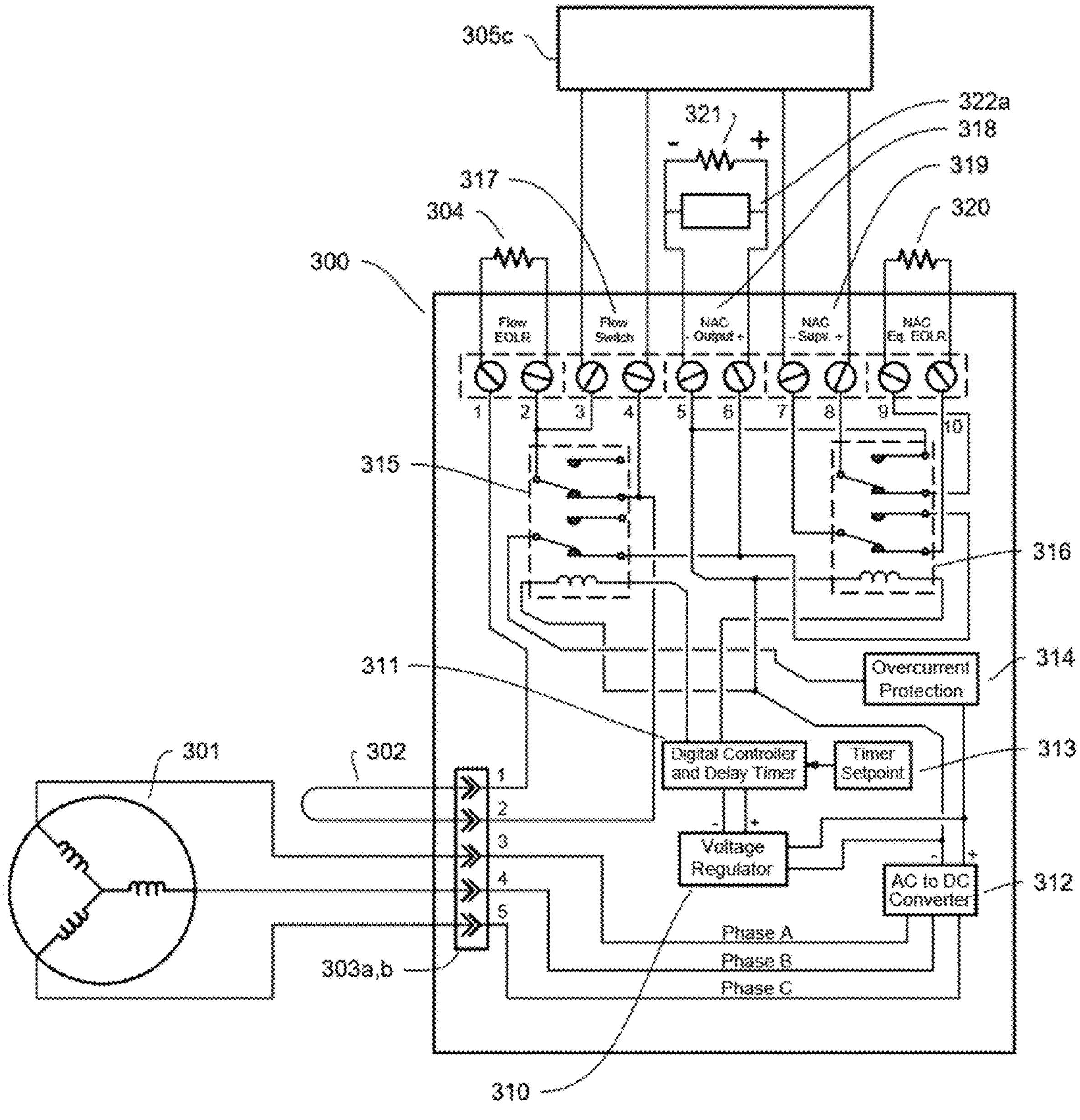

FIG. 3C shows the embodied invention during a fire. The fire alarm system 305*c* is connected to the flow switch terminals on the module, and circuit supervision is utilized:

1) A fire starts and activates at least one sprinkler head. Water flows through the sprinkler riser conduit. The HFS generator 301 spins and generates AC power.

2) The AC power is applied to the module 300 through the cable link connector 303*a,b*. 3) The AC power is rectified and filtered to DC 312, with a small portion of the DC power being regulated 310 to the appropriate level for the control circuitry, and the remainder of the unregulated DC power routed to the alarm relay 315.

4) The regulated DC power is applied to the digital controller and delay timer 311 which then starts its countdown automatically. The timer setpoint 313 is preferably a slide or rotary DIP switch.

5) At the same time, the supervision relay 316 is energized and changes state, which removes the NAC field wiring from the supervision monitoring point 319 and applies an equivalent EOLR 320 that matches the value of the EOLR 321 terminated at the last NAC device to avoid a circuit fault.

6) At the end of the countdown, the alarm relay 315 is energized and changes state. Simultaneously, the waterflow switch 317 is closed and unregulated DC power is applied to the NAC output 318.

7) The fire alarm system 305*c* and any of the local notification devices (bells, horns, strobes, etc.) that are connected to the NAC output are activated. For circuit protection, an overcurrent protection module 314 will remove the power from the NAC output if there is a short circuit.

8) Eventually the fire is extinguished and the water supply valve is manually closed. Water stops flowing through the sprinkler riser conduit. The HFS generator 301 stops generating power. The supervision and alarm relays de-energize.

9) The NAC output 318 deactivates, the NAC supervision monitoring 319 returns, and the fire alarm system 305*c* can be manually reset.

If the waterflow switch 317 and NAC supervision 319 fire alarm monitoring points are not monitored, circuit supervision cannot be achieved. Fault conditions will go unnoticed.

Figure 3D:
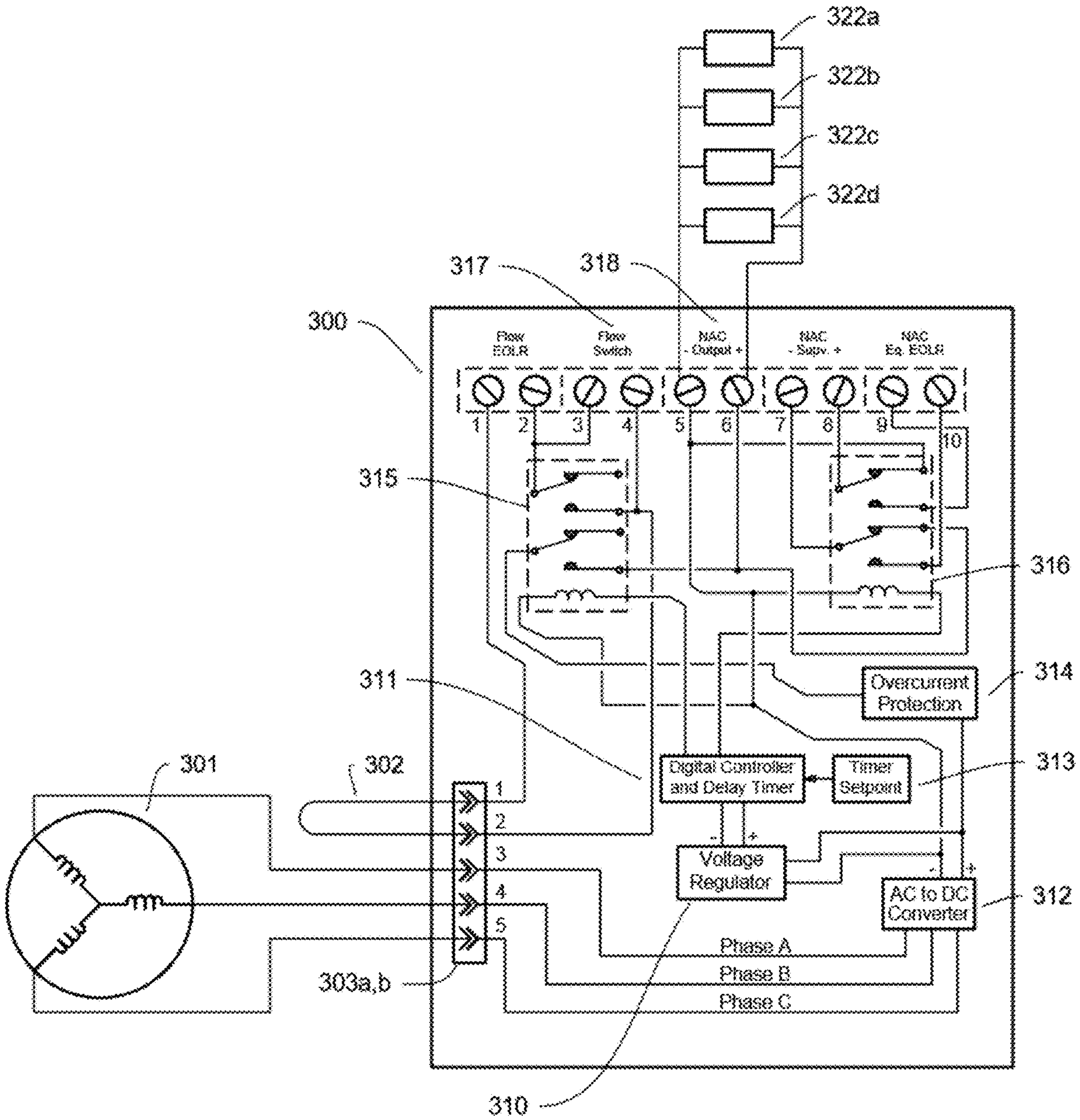

FIG. 3D shows the normal operation in the event of a fire. In this case there is no $3^{rd}$ pry fire alarm system connected to the flow switch, and no NAC circuit supervision by a $3^{rd}$ party fire alarm system:

1) Fire starts and activates at least one sprinkler head. Water flows through the sprinkler riser conduit.

2) The HFS generator 301 spins and generates AC power.

3) The AC power is applied to the HFS module 300 through the cable link connector 303*a,b*.

4) The AC power is rectified and filtered to DC 312, with a small portion of the DC power being regulated 310 to the appropriate voltage for the control circuitry, and the remainder of the unregulated DC power routed to the alarm relay 315.

5) The regulated DC power is applied to the digital controller and delay timer 311 which then starts its countdown automatically.

6) Simultaneously, the supervision relay 316 is energized and changes state.

7) At the end of the countdown, the alarm relay 315 is energized and changes state. This closes the waterflow switch 317 and applies the unregulated DC power to the NAC output 318. In this case, there is no fire alarm panel connected to the waterflow switch 317.

8) The local notification devices 322*a,b,c,d* are activated.

9) Eventually the fire is extinguished and the water supply valve is manually closed. Water stops flowing through the sprinkler riser conduit. The HFS generator 301 stops generating power.

10) The supervision and alarm relays de-energize and revert back to their original standby state.

11) The NAC output is de-energized and the notification appliances 322*a,b,c,d* deactivate.

Figure 3E:
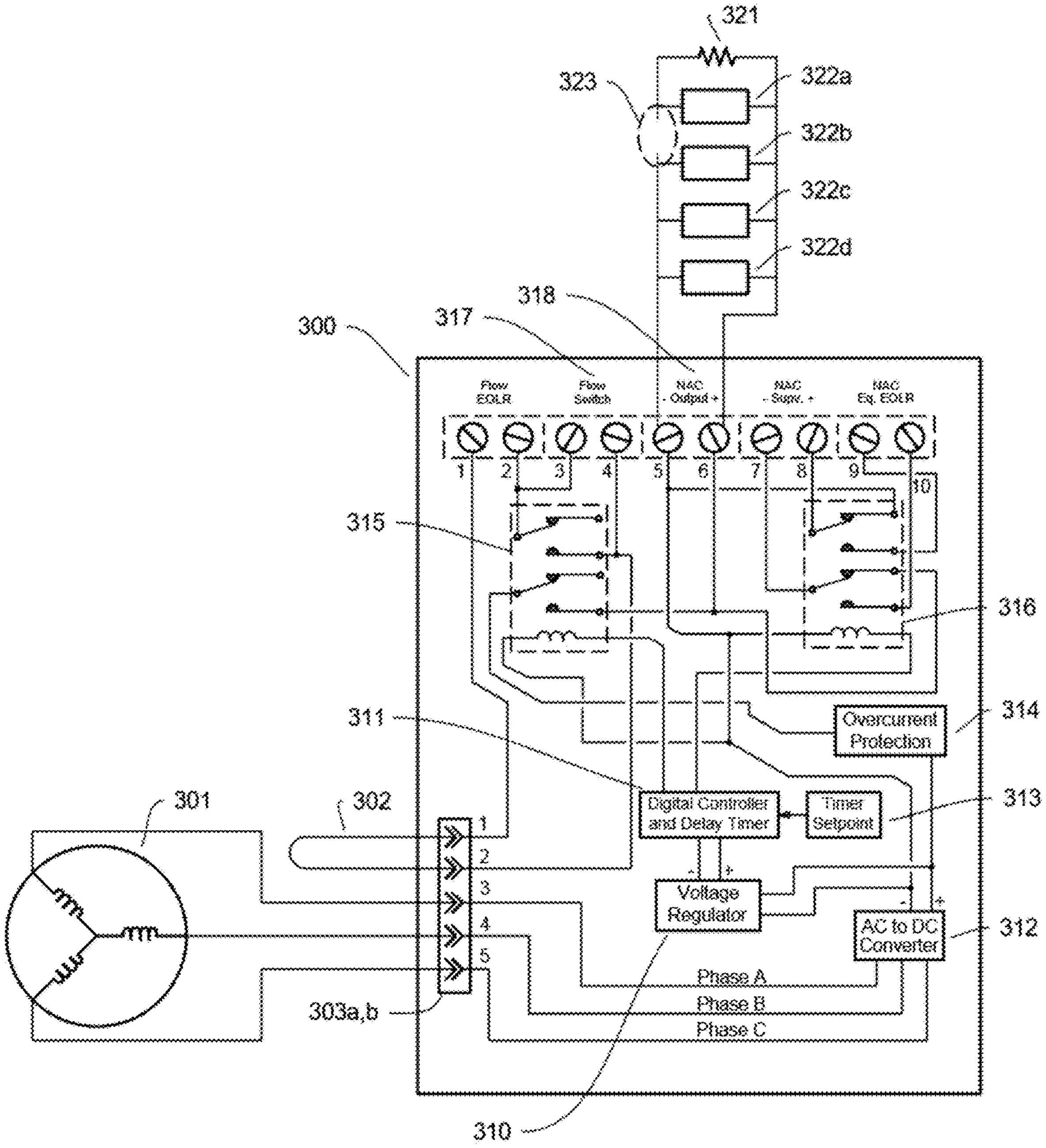

FIG. 3E shows the operation of the modular design 300 in the event of a fire, without a $3^{rd}$ party fire alarm system connected to the flow switch, and not utilizing circuit supervision by a $3^{rd}$ party fire alarm system, where the NAC field wiring has been damaged or disconnected 323:

1) The NAC field wiring between the NAC output and the last notification device on the circuit has been either damaged due to an unintentional physical act or disconnected in order to perform maintenance.

2) A fire starts and activates at least one sprinkler head. Water flows through the sprinkler riser conduit. The HFS generator 301 spins and generates AC power.

3) The AC power is applied to the HFS module through the cable link connector 303*a,b*.

4) The AC power is rectified and filtered to DC 312, with a small portion of the DC power being regulated 310 to the appropriate level for the control circuitry, and the remainder of the unregulated DC power routed to the alarm relay 315.

5) The regulated DC power is applied to the digital controller and delay timer 311 which then starts its countdown automatically.
6) The supervision relay 316 is energized and changes state prior to the end of the countdown.
7) The alarm relay 315 is also energized and changes state at the end of the countdown, simultaneously closing the waterflow switch 317 and applying the unregulated DC power to the NAC output 318. In this case, there is no $3^{rd}$ party fire alarm panel attached to the waterflow switch.
8) Any of the local notification devices 322*b,c,d* that are electrically correct and connected to the NAC output are activated. However, should the trouble condition be a short circuit instead of an open circuit 323 as illustrated, an overcurrent protection module 314 will prevent the unregulated DC power from reaching the NAC output. In this case, none of the notification devices 322*a,b,c,d* will operate.
9) Eventually the fire is extinguished and the water supply valve is manually closed. Water stops flowing through the sprinkler riser conduit. The HFS generator 301 stops generating power.
10) The supervision 316 and alarm 315 relays de-energize and revert back to their original standby state.
11) The NAC output 318 deactivates.

This unsatisfactory result can be avoided with the addition of an end of line resistor 321 and a monitoring point from a $3^{rd}$ party fire alarm system.

The NAC EOLR 321 is a special inclusion into the operation of the HFS. If included, the supervision of the NAC field wiring, and subsequently all of the notification devices that are attached to this circuit, is accomplished with the addition of a monitoring point from a $3^{rd}$ party fire alarm system.

The HFS control module has three associated NAC I/O positions:

1) the NAC Output—the connection point for the notification appliance circuit wiring.
2) the NAC Supv. output—the connection point for the fire alarm's supervision monitoring wiring.
3) the Eq. EOLR input—the connection point for the equivalent end of line resistor.

The notification appliance circuit wiring connects to the NAC output and extends outward to the field, following a path through each location in the building where the notification devices are mounted, attaching to each device via its terminal screws, and then terminating at the last device with an appropriate valued end of line resistor across its same terminals. This EOLR is what the monitoring point senses, showing a normal condition on the fire alarm system. However, should the wire break or become disconnected from under the terminal screw, the monitoring point can no longer see this resistor, and consequently triggers an open circuit fault condition on the fire alarm system.

It should also be noted that if the wires have a short across them, or become grounded, the monitoring point will annunciate these fault conditions as well. The HFS control module has an internal NAC supervision circuit that connects the NAC output field wiring to the NAC supervision monitoring point (when in a non-fire standby state), via an delectromagnetic relay in reverse polarity. This blocks all of the monitoring point's current from passing through the polarized (diode protected) notification devices, forcing the current to flow exclusively through the EOLR, thereby preventing a false short circuit fault condition. Once the module is triggered due to a fire, and before the timer has completed the countdown, the internal NAC supervision relay removes the NAC output field wiring and its EOLR from the supervision monitoring point. Simultaneously, the equivalent EOLR is placed across the NAC supervision monitoring point output to prevent a false open circuit fault condition. The equivalent EOLR must match the resistor value that is connected to the last device out in the field. Therefore, the only reason for the equivalent EOLR is to satisfy the NAC supervision circuit and keep the fire alarm system clear of any false open circuit conditions whenever the HFS has been triggered due to a fire.

In general, the digital controller electronically controls when the alarm relay, and supervision relay when used, energizes and changes state. For example: a) if only an alarm relay is used, as shown in the bare bones home configuration, the alarm relay would be energized and change state at the end of the timer countdown; and b) when using both an alarm and supervision relay, as shown in the commercial configuration, the supervision relay would change state at any time before the alarm relay, to prevent power from the HFS generator back feeding into the NAC supervision monitoring point, and causing possible damage to the 3rd party fire alarm system. And through proprietary code commands, i.e., programming, the digital controller starts its timer and relay output sequence as soon as the HFS control module is powered up via the HFS generator; then resets automatically and de-energizes the relay(s) as soon as the HFS generator stops providing power due to the sprinkler control valve being closed and water no longer flowing through the sprinkler riser.

Embodiments of the present invention utilize a digital controller or a microcontroller device which includes a microprocessor, programmable memory components, programmable analog and digital blocks, and volatile or non-volatile memory. A microcontroller contains one or more processor cores along with memory and programmable input/output peripherals. Program memory is usually included on chip, as well as RAM. Microcontrollers are primarily designed for embedded applications, but also provide for general purpose applications and functions. Various microcontrollers have differing features, including different capacities, and are often purpose built or selected from a wide variety of available designs.

While various embodiments of the present invention have been described, the invention may be modified and adapted to various operational methods to those skilled in the art. Therefore, this invention is not limited to the description and figures shown herein, and includes all such embodiments, changes, and modifications that are encompassed by the scope of the claims.

The invention claimed is:

1. A hydroelectric system designed to power at least one alarm notification device during a fire comprising:

A) a plurality of sprinkler heads connected to sprinkler piping,
B) a water supply pipe connected to said sprinkler piping,
C) said water supply pipe having an inline electrical generator, said inline electrical generator creates power when water flows through it,
D) said inline electrical generator is electrically connected to a control module,
E) said control module includes a delay timer having a predetermined time setpoint for a countdown,
F) said delay timer begins said countdown when said inline electrical generator creates said power,
G) said control module activates an alarm relay after said countdown reaches zero, H) said alarm relay directs said power from said inline electrical generator to activate said at least one alarm notification device, and I) whereby said at least one alarm notification device is activated when said water flows through at least one of said plurality of sprinkler heads free of the use of external electrical power.

2. The hydroelectric system of claim 1, said control module further comprising:

A) an AC to DC power converter connected to said inline electrical generator,

B) a voltage regulator connected to said AC to DC power converter,

C) a digital controller incorporating said delay timer, said delay timer is connected to said voltage regulator, D) said timer setpoint connected to said digital controller, E) said alarm relay connected to said digital controller, F) an overcurrent protection module connected to said AC to DC power converter, and G) said overcurrent protection module is connected to said alarm relay.

3. The hydroelectric system of claim 1, whereby said power from said inline electrical generator to said at least one alarm notification device is free of voltage regulation.

4. The hydroelectric system of claim 1, further comprising:

A) a separate fire alarm system connected to said alarm relay,

B) said alarm relay changes state when said delay timer countdown reaches zero,

C) said separate fire alarm system is connected to a plurality of separate alarm notification devices, and D) whereby said separate alarm notification devices are activated by said separate fire alarm system when said water flows through at least one of said plurality of sprinkler heads.

5. The hydroelectric system of claim 4, further comprising:

A) an end of line resistor connected to flow switch contacts of said alarm relay, B) said separate fire alarm system monitors said end of line resistor for circuit continuity, and C) said separate fire alarm system annunciates lack of continuity to said end of line resistor.

6. The hydroelectric system of claim 4, whereby said power from said inline electrical generator to said at least one alarm notification device is free of voltage regulation.

7. A hydroelectric system designed to power at least one alarm notification device during a fire comprising:

A) a plurality of sprinkler heads connected to sprinkler piping,

B) a water supply pipe connected to said sprinkler piping,

C) said water supply pipe having an alarm check valve that opens a water pathway when water flows through said water supply pipe, D) said water pathway having an inline electrical generator, E) said inline electrical generator is electrically connected to a control module, F) said control module includes a delay timer having a predetermined time setpoint for a countdown, G) said delay timer begins said countdown when said inline electrical generator creates power, H) said control module activates an alarm relay after said countdown reaches zero, I) said alarm relay directs said power from said inline electrical generator to said at least one alarm notification device, and J) whereby said at least one alarm notification device is activated when water flows through at least one of said plurality of sprinkler heads free of the use of external electrical power.

8. The hydroelectric system of claim 7, whereby said power from said inline electrical generator to said at least one alarm notification device is free of voltage regulation.

9. The hydroelectric system of claim 8, said control module further comprising:

A) a power converter that converts AC to DC and is connected to said inline electrical generator, B) a voltage regulator connected to said AC to DC power converter, C) a digital controller having said delay timer connected to said voltage regulator, D) said timer setpoint connected to said digital controller, E) an overcurrent protection module connected to said AC to DC power converter, F) said alarm relay connected to said digital controller, and G) a supervising relay connected to said digital controller.

10. The hydroelectric system according to claim 9 additionally comprising:

A) an end of line resistor connected to said alarm relay,

B) a plug for the connection between said inline electrical generator and said control module, and C) a flow switch output.

11. The hydroelectric system according to claim 9 additionally comprising a waterflow switch connected to an external fire alarm system.

12. The hydroelectric system according to claim 9 additionally comprising said at least one alarm notification device connected to said inline electrical generator through a notification appliance circuit.

13. The hydroelectric system according to claim 9 additionally comprising an end of line resistor connected to said at least one alarm notification device for the function of ensuring circuit integrity, said end of line resistor connected to a supervisory circuit, said supervisory circuit being monitored by a supervisory control panel having a plurality of supervisory circuits.

14. The hydroelectric system of claim 11 further comprising:

A) a jumper wire incorporated into a plug for said inline electric generator onto said control module, and B) said external fire alarm system monitors a continuity of said jumper wire.

15. A hydroelectric system designed to power an electronic flow switch circuit for an external fire alarm system comprising:

A) a plurality of sprinkler heads connected to sprinkler piping,

B) a water supply pipe connected to said sprinkler piping,

C) said water supply pipe having an alarm check valve that opens a water pathway when water flows through said water supply pipe, D) said water pathway having an inline electrical generator, said inline electrical generator creates power when water flows through it, E) said inline electrical generator is electrically connected to a control module, F) said control module includes a delay timer having a predetermined time setpoint for a countdown, G) said control module includes a flow switch output, said flow switch output is connected to a first input of said external fire alarm system, H) said flow switch output is connected to an end of line resistor, said end of line resistor verifies wiring continuity from said flow switch output to said external fire alarm system, I) an alarm relay is energized when said countdown reaches zero, J) when said alarm relay is energized said external fire alarm system is activated by said alarm relay, and K) whereby said external fire alarm system is notified when said water flows through at least one of said plurality of sprinkler heads free of the use of external electrical power.

16. The hydroelectric system of claim 15 further comprising:

A) a power converter that converts AC to DC, said power converter is connected to said inline electrical generator, B) a voltage regulator is connected to said power converter, C) said delay timer is included in a digital controller, said digital controller is connected to said voltage regulator, D) said timer setpoint is connected to said digital controller, E) an overcurrent protection module is connected to said power converter, and F) said alarm relay is connected to said digital controller.

17. The hydroelectric system of claim 15 further comprising:

A) a supervising relay that is connected to said digital controller,

B) a second input of said external fire alarm system is connected to:

i) a supervisory end of line resistor through a supervisory relay when de-energized, and ii) an equivalent end of line resistor through said supervisory relay when energized.

18. The hydroelectric system of claim 15, wherein at least one alarm notification device is activated when said alarm relay energizes.

* * * * *